US011718076B1

(12) United States Patent
Miksic et al.

(10) Patent No.: US 11,718,076 B1
(45) Date of Patent: Aug. 8, 2023

(54) BIODEGRADABLE TENSIONING FILM AND FABRICATION PROCESSES FOR MAKING SAME

(71) Applicant: Cortec Corporation, White Bear Lake, MN (US)

(72) Inventors: Boris Miksic, Longboat Key, FL (US); Tim Bliss, Mora, MN (US); Caleb Pheneger, Roseville, MN (US)

(73) Assignee: Cortec Corporation, White Bear Lake, MN (US)

( * ) Notice: Subject to any disclaimer, the term of this patent is extended or adjusted under 35 U.S.C. 154(b) by 0 days.

(21) Appl. No.: 17/579,679

(22) Filed: Jan. 20, 2022

Related U.S. Application Data

(60) Provisional application No. 63/142,164, filed on Jan. 27, 2021.

(51) Int. Cl.
| | |
|---|---|
| B32B 27/18 | (2006.01) |
| B32B 27/08 | (2006.01) |
| B32B 27/36 | (2006.01) |
| B29C 48/08 | (2019.01) |
| B29C 48/18 | (2019.01) |
| C08K 5/00 | (2006.01) |
| C08K 3/26 | (2006.01) |
| C08K 3/013 | (2018.01) |
| C08L 67/02 | (2006.01) |
| C08K 3/36 | (2006.01) |
| C08K 5/17 | (2006.01) |

(52) U.S. Cl.
CPC ............. *B32B 27/18* (2013.01); *B29C 48/08* (2019.02); *B29C 48/18* (2019.02); *B32B 27/08* (2013.01); *B32B 27/36* (2013.01); *B32B 2250/03* (2013.01); *B32B 2250/244* (2013.01); *B32B 2307/7163* (2013.01); *B32B 2307/744* (2013.01); *B32B 2307/746* (2013.01); *B32B 2307/752* (2013.01); *B32B 2367/00* (2013.01); *C08K 3/013* (2018.01); *C08K 3/36* (2013.01); *C08K 5/0008* (2013.01); *C08K 5/17* (2013.01); *C08K 2003/265* (2013.01); *C08L 67/02* (2013.01); *Y10T 428/31786* (2015.04)

(58) Field of Classification Search
None
See application file for complete search history.

(56) References Cited

U.S. PATENT DOCUMENTS

| | | | |
|---|---|---|---|
| 4,051,066 A * | 9/1977 | Miksic | ............... C08K 5/17 148/264 |
| 4,275,835 A | 6/1981 | Miksic et al. | |
| 4,973,448 A | 11/1990 | Carlson et al. | |
| 5,139,700 A | 8/1992 | Miksic et al. | |
| 5,209,869 A | 5/1993 | Miksic et al. | |
| 5,320,778 A | 6/1994 | Miksic et al. | |
| 5,326,529 A | 7/1994 | Miksic et al. | |
| 5,332,525 A | 7/1994 | Miksic et al. | |
| 5,344,589 A | 9/1994 | Miksic et al. | |
| 5,391,423 A * | 2/1995 | Wnuk | ............... B32B 27/306 428/424.8 |
| 5,393,457 A | 2/1995 | Miksic et al. | |
| 5,422,187 A | 6/1995 | Miksic et al. | |
| 5,597,514 A | 1/1997 | Miksic et al. | |
| 5,715,945 A | 2/1998 | Chandler | |
| 5,750,053 A | 5/1998 | Miksic et al. | |
| 5,854,145 A | 12/1998 | Chandler et al. | |
| 5,855,975 A | 1/1999 | Miksic et al. | |
| 5,894,040 A | 4/1999 | Foley et al. | |
| 6,028,160 A | 2/2000 | Chandler et al. | |
| 6,054,512 A | 4/2000 | Nelson et al. | |
| 6,085,905 A | 7/2000 | Miksic et al. | |
| 6,156,929 A * | 12/2000 | Chandler | ............... C08L 67/04 562/590 |
| 6,174,461 B1 | 1/2001 | Miksic et al. | |
| 6,280,528 B1 | 8/2001 | Kharshan et al. | |
| 6,306,210 B1 | 10/2001 | Miksic et al. | |
| 6,342,101 B1 | 1/2002 | Miksic et al. | |
| 6,420,470 B1 | 7/2002 | Miksic et al. | |
| 6,555,600 B2 | 4/2003 | Sobkin et al. | |
| 6,617,415 B1 * | 9/2003 | Miksic | ............... C08L 67/04 528/193 |
| 6,655,156 B1 | 12/2003 | Miksic et al. | |
| 6,695,897 B1 | 2/2004 | Miksic et al. | |
| 6,764,615 B2 | 7/2004 | Miksic et al. | |
| 6,800,594 B2 | 10/2004 | Miksic et al. | |
| 6,984,426 B2 | 1/2006 | Miksic et al. | |
| 7,014,694 B1 | 3/2006 | Miksic et al. | |
| 7,048,873 B1 | 5/2006 | Miksic et al. | |
| 7,118,615 B1 | 10/2006 | Miksic et al. | |
| 7,125,441 B1 | 10/2006 | Furman et al. | |

(Continued)

FOREIGN PATENT DOCUMENTS

| | | | |
|---|---|---|---|
| AT | 520608 A1 * | 5/2019 | |
| WO | WO 2011/005178 A * | 1/2011 | |

Primary Examiner — Vivian Chen
(74) Attorney, Agent, or Firm — Taft Stettinius & Hollister LLP

(57) ABSTRACT

A multilayer co-extruded film includes an inner layer positioned at a first surface of the multi-layer film that is intended to be oriented toward an object being wrapped with the film; an outer layer positioned opposite the inner layer at a second surface of the multi-layer film that is intended to be oriented away from the object being wrapped with the film; and at least one core layer positioned between the inner layer and the outer layer. A method for making a biodegradable tensioning film that is composed of an inner layer, an outer layer and one or more core layer positioned therebetween includes extruding a three-layer film on a three-layer extruder. Each of the inner layer, the outer layer and the one or more core layer is primarily composed of a polymeric material that is biodegradable and compostable.

26 Claims, No Drawings

(56) References Cited

U.S. PATENT DOCUMENTS

| | | |
|---|---|---|
| 7,241,391 B1 | 7/2007 | Miksic et al. |
| 7,264,707 B1 | 9/2007 | Furman et al. |
| 7,297,191 B1 | 11/2007 | Miksic et al. |
| 7,492,326 B1 | 2/2009 | Bodlovic et al. |
| 7,541,089 B1 | 6/2009 | Miksic et al. |
| 7,588,820 B2 * | 9/2009 | Berg .................... A47J 36/027 428/323 |
| 7,763,213 B2 | 7/2010 | Miksic et al. |
| 7,892,601 B1 | 2/2011 | Meyer et al. |
| 8,409,340 B1 | 4/2013 | Kharshan et al. |
| 8,440,095 B1 | 5/2013 | Kharshan et al. |
| 8,603,603 B2 | 12/2013 | Meyer et al. |
| 8,790,457 B1 | 7/2014 | Kharshan et al. |
| 8,795,589 B1 | 8/2014 | Furman et al. |
| 8,800,224 B1 | 8/2014 | Kharshan et al. |
| 9,327,311 B1 | 5/2016 | Kharshan et al. |
| 9,435,037 B2 | 9/2016 | Kharshan et al. |
| 9,518,328 B1 | 12/2016 | Whited et al. |
| 10,697,070 B1 | 6/2020 | Solntsev et al. |
| 11,097,139 B1 | 8/2021 | Shen et al. |
| 2001/0016615 A1 | 8/2001 | Sobkin et al. |
| 2002/0195590 A1 | 12/2002 | Miksic et al. |
| 2003/0166748 A1 * | 9/2003 | Khemani ................ C08J 5/18 524/47 |
| 2003/0166779 A1 * | 9/2003 | Khemani ............... C08L 67/02 525/178 |
| 2004/0144957 A1 | 7/2004 | Miksic et al. |
| 2004/0234790 A1 | 11/2004 | Smith et al. |
| 2006/0121220 A1 | 6/2006 | Miksic et al. |
| 2006/0130709 A1 | 6/2006 | Miksic et al. |
| 2007/0138031 A1 | 6/2007 | Miksic et al. |
| 2008/0188593 A1 * | 8/2008 | Bastioli ................. C08L 67/02 525/437 |
| 2011/0071238 A1 * | 3/2011 | Bastioli ................... C08J 5/18 524/72 |
| 2011/0237743 A1 * | 9/2011 | Ren ........................ C08J 5/18 528/301 |
| 2011/0237750 A1 * | 9/2011 | Ren ...................... C08G 63/20 525/173 |
| 2011/0251346 A1 * | 10/2011 | Li ............................ C08L 23/10 525/63 |
| 2012/0316257 A1 * | 12/2012 | Bastioli ................. C08L 67/02 521/182 |
| 2013/0157032 A1 * | 6/2013 | Wang ..................... B32B 27/36 428/220 |
| 2013/0217836 A1 * | 8/2013 | Bastioli ................... C08J 5/18 528/302 |
| 2016/0279913 A1 * | 9/2016 | Manrique ............... B32B 37/14 |
| 2016/0347945 A1 * | 12/2016 | Ho ............................ C08J 3/005 |
| 2017/0002238 A1 * | 1/2017 | Ihrig .................. C08G 18/4238 |
| 2017/0305621 A1 * | 10/2017 | Miller .................. B65D 65/466 |
| 2019/0256681 A1 * | 8/2019 | LaPray ................. C08J 11/16 |
| 2020/0339803 A1 * | 10/2020 | Allen ...................... C08L 3/02 |
| 2020/0376822 A1 * | 12/2020 | Loos ...................... B29C 48/40 |
| 2022/0212862 A1 * | 7/2022 | Yang ..................... B32B 27/20 |

* cited by examiner

BIODEGRADABLE TENSIONING FILM AND FABRICATION PROCESSES FOR MAKING SAME

CROSS REFERENCE TO RELATED APPLICATIONS

This application claims priority to U.S. Provisional Patent Application No. 63/142,164 filed on Jan. 27, 2021, which is hereby incorporated by reference herein in its entirety.

BACKGROUND OF THE DISCLOSURE

The present disclosure generally relates to novel biodegradable tensioning films and methods for fabricating and using same. The multilayer tensioning films of this disclosure can be used in a wide variety of applications, including, for example, as a protective wrap for bulk materials, machinery parts or pallets of other products during shipment and/or storage, and can be disposed of by composting.

Tensioning films as described herein, also referred to as "EcoWrap films" or "EcoWrap," are suitable for use as a green replacement for polyolefin stretch films currently used in industrial, agriculture (e.g., hay wrap), food, beverage and pharmaceutical industries, among others. A major problem associated with conventional tensioning films is that, following use, their disposal creates significant environmental concerns. Therefore, a need remains for the manufacture of alternative tensioning films that can be disposed of in more environmentally friendly ways. The present disclosure addresses this need.

SUMMARY

In one aspect, the present disclosure provides a multilayer co-extruded film. For ease of description, the layers of the film are referred to herein as an "inner layer," which is the layer positioned at the surface of the multi-layer film that is intended to be oriented toward the object being wrapped when the film is in use, an "outer layer," which is the layer positioned opposite the inner layer, i.e., positioned at the surface of the multi-layer film that is intended to be oriented away from the object being wrapped when the film is in use, and one or more "core layer," which is/are positioned between the inner layer and the outer layer. In one embodiment, the multilayer film includes a single core layer, and is referred to herein as a 3-layer film. In other embodiments, the multilayer film may have two or more core layers.

Each of the layers is primarily composed of a polymeric material that is biodegradable and compostable, such as, for example, and without limitation, an aliphatic-aromatic co-polyester material. The inner layer also includes a cling agent added to the polymeric material to enable the multilayer film to cling or "stick" to itself during wrapping of products. The outer layer also includes an anti-blocking agent added to the polymeric material to aid in separating the film during the manufacturing process, and also for subsequent use when the film is dispensed from a roll. In one embodiment, a 3-layer film is provided that includes a single core layer, the core layer being composed 100% of the biodegradable and compostable polymeric material; however, the present disclosure contemplates that certain other additives can be added to one or more of the inner layer, the core layer and the outer layer of a 3-layer film in alternative embodiments, and that multilayer films composed of multiple core layers can include one or more additives added to one or more of the core layers of the multilayer film.

Other features, characteristics, objects and benefits of the disclosure will become apparent from the following description.

DETAILED DESCRIPTION OF CERTAIN EMBODIMENTS

For the purposes of promoting an understanding of the principles of the invention, reference will now be made to the embodiments described herein and specific language will be used to describe the same. The embodiments of the present disclosure described herein are not intended to be exhaustive or to limit the teachings of the present disclosure to the precise forms disclosed in the following detailed description. Rather, the embodiments are chosen and described so that others skilled in the art may appreciate and understand the principles and practices of the present disclosure. It will therefore be understood that no limitation of the scope of the invention is intended by the description of specific embodiments. Any alterations and further modifications in the described embodiments, and any further applications of the principles of the invention as described herein are contemplated as would normally occur to one skilled in the art to which the invention relates.

Unless defined otherwise, all technical and scientific terms used in this disclosure have the same meaning as commonly understood by one of ordinary skill in the art to which this application belongs. Moreover, it should be understood that when certain ranges are recited herein in connection with various embodiments of the present disclosure, all values and ranges which fall between such listed ranges are intended to be encompassed by the present teaching unless explicitly stated otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 4.62, 5, and 5.9. This applies regardless of the breadth of the range. The upper and lower limits of these intervening ranges may independently be included in the smaller ranges, and are also encompassed within the disclosure, subject to any specifically excluded limit in the stated range. Where the stated range includes one or both of the limits, ranges excluding either or both of those included limits are also included in the disclosure, unless the context clearly dictates otherwise. Finally, although specific methods and materials are described herein with respect to certain exemplary aspects of the present disclosure, it should be understood and appreciated that other methods and materials similar or equivalent to those described herein can be used in the practice or testing of the present disclosure without straying from the intended scope of this disclosure.

Problems and challenges associated with disposal of polyolefin stretch films in the prior art following their use are addressed by the present disclosure, which provides new stretch films that are compostable, and also methods for making and methods for using such stretch films.

In one embodiment, a compostable stretch film is capable of decomposition by natural elements and bacteria. In another embodiment, a compostable stretch film is capable of disintegrating into natural elements like soil in a composting environment, leaving no toxicity in the soil. In yet another embodiment, the disintegrating occurs in under 6 months in a standard commercial composting facility. In still another embodiment, a compostable plastic or compostable plastic product is one that undergoes degradation by biological processes during composting to yield $CO_2$, water, inorganic compounds, and biomass at a rate consistent with other known compostable materials and that leaves no visible, distinguishable, or toxic residue. See for example ASTM Standard D6400, 2012, "Standard Specification for Compostable Plastics," ASTM International, West Conshohocken, Pa., 2004, DOI: 10.1520/D6400-04, www.astm.org. In still yet another embodiment, a compostable stretch film meets EN 13432 (09-2000)/ASTM D6400 standard for commercial composting, and complies with the requirements of the EU Packaging Directive. (94/62/EEC).

One aspect of this disclosure is directed to a compostable stretch film that is composed of multiple co-extruded layers, namely, an inner layer, an outer layer and one or more core layer positioned between the inner and outer layers. In one embodiment, the compostable stretch film is a 3-layer film that includes a single core layer comprising an aliphatic-aromatic co-polyester, an inner layer comprising an aliphatic-aromatic co-polyester and a propylene-based elastomer, and an outer layer comprising an aliphatic-aromatic co-polyester and an anti-blocking agent. The combination of an aliphatic-aromatic co-polyester with a propylene-based elastomer in the inner layer imparts a desirable "clinging" quality to the inner layer that enhances the ability of separate portions of the stretch film to cling to one another during wrapping of a product in a "cling wrap" manner. In that regard, the propylene-based elastomer in the inner layer may also be referred to as a cling agent. The combination of an anti-blocking agent with an aliphatic-aromatic co-polyester in the outer layer modifies frictional properties of the outer layer and assists in minimizing undesirable surface interactions during manufacture of the tensioning film and during use.

In one embodiment, the inner layer comprises from about 10% to about 30% of the total film, by volume, the outer layer comprises from about 10% to about 30% of the total film, by volume and the core layer comprises (or, in the case of a film having more than one core layer, the combined core layers comprise) from about 40% to about 80% of the total film, by volume. In another embodiment, the inner layer comprises from about 15% to about 25% of the total film, by volume, the outer layer comprises from about 15% to about 25% of the total film, by volume and the core layer comprises (or, in the case of a film having more than one core layer, the combined core layers comprise) from about 50% to about 70% of the total film, by volume. In yet another embodiment, the inner layer comprises about 20% of the total film, by volume, the outer layer comprises about 20% of the total film, by volume and the core layer comprises (or, in the case of a film having more than one core layer, the combined core layers comprise) about 60% of the total film, by volume. When the term "about" is used herein to modify a value, the expression is intended to also include the value as an exact amount. For example, "about 5%" encompasses "about 5%" and also "5%." Generally, the term "about" includes an amount that would be expected to be within experimental error. In addition, the term "about" includes values that are within 10% less to 10% greater of the value provided. For example, "about 50%" means "from 45% to 55%." Also, by way of example, "about 30" means "from 27 to 33."

With further reference to the inner layer, in one embodiment, the aliphatic-aromatic co-polyester comprises at least about 90%, by weight, of the inner layer and the propylene-based elastomer comprises at least about 1% of the inner layer. In another embodiment, the aliphatic-aromatic co-polyester comprises at least about 93%, by weight, of the inner layer and the propylene-based elastomer comprises at least about 2% of the inner layer, and in still another embodiment, the aliphatic-aromatic co-polyester comprises about 96%, by weight, of the inner layer and the propylene-based elastomer comprises about 4% of the inner layer. As will be appreciated by a person of ordinary skill in the art, when a propylene-based elastomer is present in the inner layer in proportions as described herein, the propylene-based elastomer in various embodiments will comprise from about 0.1 to about 1.2% of the overall multilayer tensioning film, by weight. In a preferred embodiment, the propylene-based elastomer comprises no more than 1.0% of the overall multilayer tensioning film, by weight. In one preferred embodiment, the propylene-based elastomer comprises about 0.8% of the overall multilayer tensioning film, by weight.

An optional corrosion inhibitor can also optionally be included in the inner layer. Thus, in one embodiment, the inner layer also includes a quantity of a corrosion inhibitor. Presence of a corrosion inhibitor may be advantageous, for example, when the tensioning film is to be used to wrap products that are susceptible to corrosion, such as, for example, products having metal parts, and that may be exposed to moisture or other corrosive elements during shipment or storage. Corrosion inhibitors may also be desired in the inner layer of tensioning films that are intended for use to wrap products that are expected to remain in storage for long periods of time. In one embodiment, the corrosion inhibitor comprises at least about 0.5% of the inner layer. In other embodiments, the corrosion inhibitor comprises from about 0.5% to about 5% of the inner layer, from about 1% to about 3% of the inner layer, from about 1.5% to about 2.5% of the inner layer, or about 2% of the inner layer.

With further reference to the outer layer, in one embodiment, the aliphatic-aromatic co-polyester comprises at least about 90%, by weight, of the outer layer and the anti-blocking agent comprises at least about 0.5% of the outer layer. In another embodiment, the aliphatic-aromatic co-polyester comprises at least about 94%, by weight, of the outer layer and the anti-blocking agent comprises at least about 1% of the outer layer, and in still another embodiment, the aliphatic-aromatic co-polyester comprises about 98%, by weight, of the outer layer and the anti-blocking agent comprises about 2% of the outer layer.

While the core layer or layers can include additives, in some embodiments the core layer is (or, in the case of a film having more than one core layer, the combined core layers are) composed 100% of an aliphatic-aromatic co-polyester.

Further with regard to additives in the one or more core layer(s), in one embodiment, an electrostatic discharge additive (also referred to as an "ESD additive") is included in the core layer (or in the case of a film having more than one core layer, is included in one or more of the core layers). In some embodiments, the ESD additive is one that is certified compostable. In some embodiments, the additive is a composition that is composed of polylactic acid. In other embodiments, the additive is a composition that is composed of polylactic acid and at least one alkylsulphonate. In some embodiments, the alkylsulphonate is present in the additive in an amount less than 25%, by weight. A suitable ESD additive as contemplated by this disclosure is the product SUKANO PLA S546Antistatic Masterbatch, which is commercially available from Sukano AG (Schindellegi, Switzerland). In one embodiment of a multi-layer film that includes a single core layer, an ESD additive is included in the core layer in a concentration range of from about 0.01% to about 10%, by weight. In another embodiment, the concentration is from about 5% to about 10%. In an embodiment of a multi-layer film that includes multiple core layers, an ESD additive is included in one or more of the core layers in amounts whereby the total concentration of the ESD additive in all of the core layers is from about 0.01% to about 10%, by weight. In another embodiment, the concentration is from about 5% to about 10%.

With reference to the embodiments described above, the aliphatic-aromatic co-polyester present in the inner layer, the core layer or layers and the outer layer of a tensioning film in accordance with the present disclosure can be the same aliphatic-aromatic co-polyester or, in other embodiments, different aliphatic-aromatic co-polyesters can be used in one or more of the layers than that used on one or more of the other layers. In one embodiment, the aliphatic-aromatic co-polyester selected for use in each of the inner layer, the core layer or layers and the outer layer is an aliphatic-aromatic co-polyester based on the monomers 1,4-butanediol, adipic acid and terephthalic acid, a suitable example of which is the product ecoflex® that is commercially available from BASF.

Further with reference to the embodiments described above, in one embodiment, the propylene-based elastomer is primarily composed of isotactic propylene repeat units with random ethylene distribution, suitable examples of which are the Vistamaxx™ series of products that are commercially available from ExxonMobil, such as Vistamaxx™ Performance Polymer 6202.

Further with reference to the embodiments described above, in one embodiment, the anti-blocking agent comprises a material selected from the group consisting of chalk, diatomaceous earth, talc and silica powders. In one embodiment, the anti-blocking agent comprises chalk.

Further with reference to the embodiments described above, in one embodiment, the corrosion inhibitor comprises one or more amine, one or more organic acid, one or more reacted salt of an amine and/or an organic acid, one or more metal salt of an organic acid, a nitrite salt and/or a triazole. In another embodiment, the corrosion inhibitor comprises a member selected from the group consisting of sodium benzoate, sodium nitrite, sodium molybdate, sodium disebacate, benzotriazole and combinations thereof In one embodiment, the multilayer tensioning film as a whole comprises about 99% aliphatic-aromatic co-polyester, about 0.8% propylene-based elastomer and about 0.2% chalk. In another embodiment, the three-layer tensioning film as a whole comprises about 98.6% aliphatic-aromatic co-polyester, about 0.8% propylene-based elastomer, about 0.2% chalk and about 0.4% corrosion inhibitor.

Another aspect of this disclosure is directed to methods for making a biodegradable tensioning film that is composed of an inner layer, an outer layer and one or more core layer positioned therebetween as described herein. To make such a film, conventional co-extrusion equipment and methods can be used. In one embodiment, the method comprises extruding a three-layer film on a three-layer extruder, the respective layers being composed of the materials described above. Examples of such equipment are widely known and commercially available. In one embodiment, the three-layer extruder has a 16-inch die and die gap at 0.06. In one embodiment, the extrusion process is performed with die temperatures settings at 320° F. An example of a specific embodiment of the method is set forth below:

EXAMPLE

To make a sample tensioning film, a three-layer extruder was used that includes a first extruder component (Extruder A) configured to extrude the outer layer of the tensioning film, a second extruder component (Extruder B) configured to extrude the core layer of the tensioning film and a third extruder component (Extruder C) configured to extrude the inner layer of the tensioning film.

Extruder A was a 2.5-inch extruder with a L/D of 24 to 1, and was operated with a screen configuration of 100/40/100 mesh and a screen pressure of 3400 PSI. Extruder A's screw was turned at 30 RPM using a temperature profile starting at 280° F. and graduating to 320° F.

Extruder B was a 3-inch extruder with a L/D of 24 to 1, and was operated with a screen configuration of 100/40/100 mesh and a screen pressure of 4200 PSI. Extruder B's screw was turned at 30 RPM using a temperature profile starting at 280° F. and graduating to 320° F.

Extruder C was a 2.5-inch extruder with a L/D of 24 to 1, and was operated with a screen configuration of 100/40/100 mesh and a screen pressure of 3400 PSI. Extruder C's screw turned at 30 RPM using a temperature profile starting at 280° F. and graduating to 320° F.

The materials included in the inner layer were introduced into Extruder A in proportions as described herein; the materials included in the core layer were introduced into Extruder B in proportions as described herein; and the materials included in the outer layer were introduced into Extruder C in proportions as described herein. In the performance of the co-extrusion method, the following parameters were used:

Blow up ratio of 1.87/1
Draw down ratio of 0.05
Line speed of 150 feet per minute
Air ring temperature of 50° F.
Winding pressure/web tension of 6 kg An EcoWrap tensioning film made as described in this Example has been certified by TUV Austria as "industrially compostable" (Certificate No. TA8012106218—"OK compost INDUSTRIAL"), which means that the material meets EN 13432 (09-2000)/ASTM D6400 standard for commercial composting, and complies with the requirements of the EU Packaging Directive. (94/62/EEC). Packaging products featuring OK compost INDUSTRIAL label are guaranteed as biodegradable in an industrial composting plant. Typical mechanical properties of a representative EcoWrap tensioning film made as described in this Example are set forth in Table I below:

TABLE 1

| Mechanical Properties | | | | |
|---|---|---|---|---|
| Property | | Test Method | Units | Test 1 |
| Caliper | | ASTM D6988 | mil | 1.50 |
|  |  |  | (μm) | (38.1) |
| Breaking factor | MD | ASTM D882-02 | lbs/in (N/m) | 10.27 (1799) |
|  | CD |  |  | 8.22 (1440) |
| Tensile Strength at Break | MD | ASTM D882-02 | psi (kPa) | 6347.00 (43,761.02) |
|  | CD |  |  | 5133.00 (35,390.79) |
| Elongation at Break | MD | ASTM D882-02 | % | 566.68 |
|  | CD |  |  | 901.97 |
| Yield Strength | MD | ASTM D882-02 | psi (kPa) | 3271.19 (22,554.06) |
|  | CD |  |  | 1044.73 (7203.16) |

TABLE 1-continued

Mechanical Properties

| Property | | Test Method | Units | Test 1 |
|---|---|---|---|---|
| Drop Impact Resistance | | ASTM D1709-04, Test Method A | grams | 418.2 |
| Puncture Resistance | Outside | MIL-STD-3010, TM 2065 | lbf (gram force) | 4.46 (2,023.01) |
| | Inside | | | 5.24 (2,376.81) |
| Tear Strength | MD CD | ASTM D1922-06A | (mN) | 1,993.39 5,273.86 |
| Coefficient of Friction | | ASTM D1894 | static kinetic | 0.53 1.60 |
| Cling Peel | | ASTM D5458-95 | gf/in (gf/cm) | 30.54 (11.81) |

Typical values represent average laboratory values and are intended as guides only, not as specifications.

EcoWrap can be use in a wide variety of applications to replace conventional stretch wrap. It is especially beneficial for applications where disposal or recycling of conventional stretch wrap is challenging and industrial composting is available.

As will be appreciated from the descriptions herein, a wide variety of aspects and embodiments are contemplated by the present disclosure, examples of which include, without limitation, the aspects and embodiments listed below:

A multilayer co-extruded film that includes an inner layer positioned at a first surface of the multi-layer film that is intended to be oriented toward an object being wrapped with the film; an outer layer positioned opposite the inner layer at a second surface of the multi-layer film that is intended to be oriented away from the object being wrapped with the film; and at least one core layer positioned between the inner layer and the outer layer; wherein each of the layers is primarily composed of a polymeric material that is biodegradable and compostable.

A multilayer co-extruded film in accordance with any other embodiment disclosed herein, wherein the polymeric material comprises an aliphatic-aromatic co-polyester material.

A multilayer co-extruded film in accordance with any other embodiment disclosed herein, wherein the aliphatic-aromatic co-polyester material comprises a copolymer having incorporated therein at least one monomer selected from the group consisting of 1,4-butanediol, adipic acid and terephthalic acid.

A multilayer co-extruded film in accordance with any other embodiment disclosed herein, wherein the film includes a single core layer, and is referred to herein as a 3-layer film.

A multilayer co-extruded film in accordance with any other embodiment disclosed herein, wherein the core layer is composed 100 % of the biodegradable and compostable polymeric material.

A multilayer co-extruded film in accordance with any other embodiment disclosed herein, wherein the core layer further comprises at least one additive.

A multilayer co-extruded film in accordance with any other embodiment disclosed herein, wherein the inner layer comprises from about 10% to about 30% of the total film, by volume, the outer layer comprises from about 10% to about 30% of the total film, by volume and the core layer comprises from about 40% to about 80% of the total film, by volume.

A multilayer co-extruded film in accordance with any other embodiment disclosed herein, wherein the film includes two or more core layers.

A multilayer co-extruded film in accordance with any other embodiment disclosed herein, wherein the inner layer comprises from about 10% to about 30% of the total film, by volume, the outer layer comprises from about 10% to about 30% of the total film, by volume and the two or more core layers collectively comprise from about 40% to about 80% of the total film, by volume.

A multilayer co-extruded film in accordance with any other embodiment disclosed herein, wherein at least one of the two or more core layers comprises at least one additive.

A multilayer co-extruded film in accordance with any other embodiment disclosed herein, wherein the inner layer further comprises a cling agent.

A multilayer co-extruded film in accordance with any other embodiment disclosed herein, wherein the cling agent comprises a propylene-based elastomer.

A multilayer co-extruded film in accordance with any other embodiment disclosed herein, wherein the polymeric material comprises an aliphatic-aromatic co-polyester material; wherein the aliphatic-aromatic co-polyester material comprises at least about 90%, by weight, of the inner layer; and wherein the propylene-based elastomer comprises at least about 1% of the inner layer.

A multilayer co-extruded film in accordance with any other embodiment disclosed herein, wherein the propylene-based elastomer comprises from about 0.1% to about 1.2% of the multilayer co-extruded film, by weight.

A multilayer co-extruded film in accordance with any other embodiment disclosed herein, wherein the propylene-based elastomer comprises from about 0.1% to no more than 1.0% of the multilayer co-extruded film, by weight.

A multilayer co-extruded film in accordance with any other embodiment disclosed herein, wherein the inner layer further comprises a corrosion inhibitor.

A multilayer co-extruded film in accordance with any other embodiment disclosed herein, wherein the corrosion inhibitor comprises at least about 0.5% of the inner layer.

A multilayer co-extruded film in accordance with any other embodiment disclosed herein, wherein the corrosion inhibitor comprises a member selected from the group consisting of an amine, a reacted salt of an amine, an organic acid, a reacted salt of an organic acid, a metal salt of an organic acid, a nitrite salt, a triazole and combinations thereof.

A multilayer co-extruded film in accordance with any other embodiment disclosed herein, wherein the corrosion inhibitor comprises a member selected from the group consisting of sodium benzoate, sodium nitrite, sodium molybdate, sodium disebacate, benzotriazole and combinations thereof.

A multilayer co-extruded film in accordance with any other embodiment disclosed herein, wherein the outer layer further comprises an anti-blocking agent.

A multilayer co-extruded film in accordance with any other embodiment disclosed herein, wherein the anti-blocking agent comprises a member selected from the group consisting of chalk, diatomaceous earth, talc, a silica powder and combinations thereof.

A multilayer co-extruded film in accordance with any other embodiment disclosed herein, wherein the multilayer co-extruded film as a whole comprises about 99% aliphatic-aromatic co-polyester, about 0.8% propylene-based elastomer and about 0.2% chalk.

A multilayer co-extruded film in accordance with any other embodiment disclosed herein, wherein the multilayer co-extruded film as a whole comprises about 98.6% aliphatic-aromatic co-polyester, about 0.8% propylene-based elastomer, about 0.2% chalk and about 0.4% corrosion inhibitor.

A method for making a biodegradable tensioning film that is composed of an inner layer, an outer layer and one or more core layer positioned therebetween, the method including extruding a three-layer film on a three-layer extruder; wherein each of the inner layer, the outer layer and the one or more core layer is primarily composed of a polymeric material that is biodegradable and compostable; wherein the inner layer comprises from about 10% to about 30% of the total film, by volume, the outer layer comprises from about 10% to about 30% of the total film, by volume and the one or more core layer comprises from about 40% to about 80% of the total film, by volume; wherein the inner layer further comprises a cling agent; and wherein the outer layer further comprises an anti-blocking agent.

A method in accordance with any other embodiment disclosed herein, wherein the polymeric material comprises an aliphatic-aromatic co-polyester material.

A method in accordance with any other embodiment disclosed herein, wherein the aliphatic-aromatic co-polyester material comprises a copolymer having incorporated therein at least one monomer selected from the group consisting of 1,4-butanediol, adipic acid and terephthalic acid.

A method in accordance with any other embodiment disclosed herein, wherein the film includes a single core layer, and is referred to herein as a 3-layer film.

A method in accordance with any other embodiment disclosed herein, wherein the core layer is composed 100% of the biodegradable and compostable polymeric material.

A method in accordance with any other embodiment disclosed herein, wherein the core layer further comprises at least one additive.

A method in accordance with any other embodiment disclosed herein, wherein the film includes two or more core layers.

A method in accordance with any other embodiment disclosed herein, wherein at least one of the two or more core layers comprises at least one additive.

A method in accordance with any other embodiment disclosed herein, wherein the cling agent comprises a propylene-based elastomer.

A method in accordance with any other embodiment disclosed herein, wherein the polymeric material comprises an aliphatic-aromatic co-polyester material; wherein the aliphatic-aromatic co-polyester material comprises at least about 90%, by weight, of the inner layer; and wherein the propylene-based elastomer comprises at least about 1% of the inner layer.

A method in accordance with any other embodiment disclosed herein, wherein the propylene-based elastomer comprises from about 0.1% to about 1.2% of the multilayer co-extruded film, by weight.

A method in accordance with any other embodiment disclosed herein, wherein the propylene-based elastomer comprises from about 0.1% to no more than 1.0% of the multilayer co-extruded film, by weight.

A method in accordance with any other embodiment disclosed herein, wherein the inner layer further comprises a corrosion inhibitor.

A method in accordance with any other embodiment disclosed herein, wherein the corrosion inhibitor comprises at least about 0.5% of the inner layer.

A method in accordance with any other embodiment disclosed herein, wherein the corrosion inhibitor comprises a member selected from the group consisting of an amine, a reacted salt of an amine, an organic acid, a reacted salt of an organic acid, a metal salt of an organic acid, a nitrite salt, a triazole and combinations thereof A method in accordance with any other embodiment disclosed herein, wherein the corrosion inhibitor comprises a member selected from the group consisting of sodium benzoate, sodium nitrite, sodium molybdate, sodium disebacate, benzotriazole and combinations thereof A method in accordance with any other embodiment disclosed herein, wherein the anti-blocking agent comprises a member selected from the group consisting of chalk, diatomaceous earth, talc, a silica powder and combinations thereof.

A method in accordance with any other embodiment disclosed herein, wherein the multilayer co-extruded film as a whole comprises about 99% aliphatic-aromatic co-polyester, about 0.8% propylene-based elastomer and about 0.2% chalk.

A method in accordance with any other embodiment disclosed herein, wherein the multilayer co-extruded film as a whole comprises about 98.6% aliphatic-aromatic co-polyester, about 0.8% propylene-based elastomer, about 0.2% chalk and about 0.4% corrosion inhibitor.

A method in accordance with any other embodiment disclosed herein, wherein the three-layer extruder comprises a 16-inch die and die gap at 0.06; and wherein the extruding is performed with die temperature settings at 320° F.

While exemplary embodiments incorporating the principles of the present disclosure have been described herein, the same is to be considered as illustrative and not restrictive in character, it being understood that only the certain embodiments have been shown and described and that all changes, alternatives, modifications and equivalents that come within the spirit of the inventions are desired to be protected. While this disclosure provides detailed description of materials, products and methods involving compostable tensioning films having certain features and composed of certain materials, the disclosure is intended to be equally applicable to alternative materials, alternative combinations of materials, alternative products and methods of making alternative materials and products as would occur to a person of ordinary skill in the art in view of the disclosures herein.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. The terms "comprises," "comprising," "including," and "having," are inclusive and therefore specify the presence of stated features, integers, steps, operations, elements, materials and/or components, but do not preclude the presence or addition of one or more other features, integers, steps, operations, elements, materials, components and/or groups thereof. The method actions, processes, and operations described herein are not to be construed as necessarily requiring their performance in the particular order discussed or illustrated, unless specifically identified as an order of performance. It is also to be understood that additional or alternative actions or operations may be employed.

Although the terms first, second, third, etc. may be used herein to describe various elements, materials, components, regions, layers and/or sections, these elements, materials, components, regions, layers and/or sections should not be limited by these terms. These terms may be only used to distinguish one element, material, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

What is claimed is:

1. A multilayer co-extruded film, comprising:
an inner layer positioned at a first surface of the multilayer film that is intended to be oriented toward an object being wrapped with the film;
an outer layer positioned opposite the inner layer at a second surface of the multi-layer film that is intended to be oriented away from the object being wrapped with the film; and
at least one core layer positioned between the inner layer and the outer layer;
wherein each of the layers is primarily composed of a polymeric material that is biodegradable and compostable;
wherein the inner layer further comprises a cling agent; and
wherein the cling agent comprises a propylene-based elastomer.

2. The multilayer co-extruded film in accordance with claim 1 wherein the polymeric material comprises an aliphatic-aromatic co-polyester material.

3. The multilayer co-extruded film in accordance with claim 1 wherein the aliphatic-aromatic co-polyester material comprises a copolymer having incorporated therein at least one monomer selected from the group consisting of 1,4-butanediol, adipic acid and terephthalic acid.

4. The multilayer co-extruded film in accordance with claim 1 wherein the film includes a single core layer, and is referred to herein as a 3-layer film.

5. The multilayer co-extruded film in accordance with claim 4 wherein the core layer is composed 100% of the biodegradable and compostable polymeric material.

6. The multilayer co-extruded film in accordance with claim 4 wherein the core layer further comprises at least one additive.

7. The multilayer co-extruded film in accordance with claim 4 wherein the inner layer comprises from about 10% to about 30% of the total film, by volume, the outer layer comprises from about 10% to about 30% of the total film, by volume and the core layer comprises from about 40% to about 80% of the total film, by volume.

8. The multilayer co-extruded film in accordance with claim 1 wherein the film includes two or more core layers.

9. The multilayer co-extruded film in accordance with claim 8 wherein the inner layer comprises from about 10% to about 30% of the total film, by volume, the outer layer comprises from about 10% to about 30% of the total film, by volume and the two or more core layers collectively comprise from about 40% to about 80% of the total film, by volume.

10. The multilayer co-extruded film in accordance with claim 8 wherein at least one of the two or more core layers comprises at least one additive.

11. The multilayer co-extruded film in accordance with claim 1 wherein the polymeric material comprises an aliphatic-aromatic co-polyester material; wherein the aliphatic-aromatic co-polyester material comprises at least about 90%, by weight, of the inner layer; and wherein the propylene-based elastomer comprises at least about 1% of the inner layer.

12. The multilayer co-extruded film in accordance with claim 1 wherein the propylene-based elastomer comprises from about 0.1% to about 1.2% of the multilayer co-extruded film, by weight.

13. The multilayer co-extruded film in accordance with claim 1 wherein the propylene-based elastomer comprises from about 0.1% to no more than 1.0% of the multilayer co-extruded film, by weight.

14. The multilayer co-extruded film in accordance with claim 1 wherein the inner layer further comprises a corrosion inhibitor.

15. The multilayer co-extruded film in accordance with claim 14 wherein the corrosion inhibitor comprises at least about 0.5% of the inner layer.

16. The multilayer co-extruded film in accordance with claim 14 wherein the corrosion inhibitor comprises a member selected from the group consisting of an amine, a reacted salt of an amine, an organic acid, a reacted salt of an organic acid, a metal salt of an organic acid, a nitrite salt, a triazole and combinations thereof.

17. The multilayer co-extruded film in accordance with claim 14 wherein the corrosion inhibitor comprises a member selected from the group consisting of sodium benzoate, sodium nitrite, sodium molybdate, sodium disebacate, benzotriazole and combinations thereof.

18. The multilayer co-extruded film in accordance with claim 1 wherein the outer layer further comprises an anti-blocking agent.

19. The multilayer co-extruded film in accordance with claim 18 wherein the anti-blocking agent comprises a member selected from the group consisting of chalk, diatomaceous earth, talc, a silica powder and combinations thereof.

20. The multilayer co-extruded film in accordance with claim 1 wherein the multilayer co-extruded film as a whole comprises about 99% aliphatic-aromatic co-polyester, about 0.8% propylene-based elastomer and about 0.2% chalk.

21. The multilayer co-extruded film in accordance with claim 1 wherein the multilayer co-extruded film as a whole comprises about 98.6% aliphatic-aromatic co-polyester, about 0.8% propylene-based elastomer, about 0.2% chalk and about 0.4% corrosion inhibitor.

22. A method for making a biodegradable tensioning film that is composed of an inner layer, an outer layer and one or more core layer positioned therebetween, the method comprising extruding a multi-layer film on a multi-layer extruder;
wherein each of the inner layer, the outer layer and the one or more core layer is primarily composed of a polymeric material that is biodegradable and compostable;
wherein the inner layer comprises from about 10% to about 30% of the total film, by volume, the outer layer comprises from about 10% to about 30% of the total film, by volume and the one or more core layer comprises from about 40% to about 80% of the total film, by volume;

wherein the inner layer further comprises a cling agent;

wherein the cling agent comprises a propylene-based elastomer; and wherein the outer layer further comprises an anti-blocking agent.

23. The method in accordance with claim 22 wherein the inner layer further comprises a corrosion inhibitor.

24. The method in accordance with claim 22 wherein the multi-layer extruder comprises a 16-inch die and die gap at 0.06; and wherein the extruding is performed with die temperature settings at 320° F.

25. The method in accordance with claim 22 wherein the multi-layer extruder comprises a cast extruder.

26. The method in accordance with claim 22 wherein the multi-layer film is selected from the group consisting of a three-layer film, a four-layer film, a five-layer film, a six-layer film and a multi-layer film having more than six layers; and wherein the multi-layer extruder comprises an extruder selected from the group consisting of a three-layer extruder, a four-layer extruder, a five-layer extruder, a six-layer extruder and a multi-layer extruder operable to produce films having more than six layers.

* * * * *